(12) United States Patent
Arimitsu et al.

(10) Patent No.: US 7,138,742 B2
(45) Date of Patent: Nov. 21, 2006

(54) ROTATING MACHINE

(75) Inventors: Minoru Arimitsu, Kanagawa (JP); Kan Akatsu, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/895,420

(22) Filed: Jul. 21, 2004

(65) Prior Publication Data

US 2005/0052091 A1     Mar. 10, 2005

(30) Foreign Application Priority Data

Aug. 1, 2003     (JP)     ............................. 2003-205296

(51) Int. Cl.
*H02K 16/02*     (2006.01)
*H02K 1/06*     (2006.01)
*H02K 1/27*     (2006.01)

(52) U.S. Cl. ................. 310/217; 310/114; 310/156.56; 310/266; 310/259

(58) Field of Classification Search ........... 310/156.35, 310/156.36, 156.56, 216–218, 254
See application file for complete search history.

(56) References Cited

U.S. PATENT DOCUMENTS

| | | | | |
|---|---|---|---|---|
| 4,618,792 A * | 10/1986 | Yates | ..................... | 310/156.55 |
| 5,783,893 A * | 7/1998 | Dade et al. | .................. | 310/266 |
| 5,942,831 A * | 8/1999 | Yamada et al. | ............. | 310/217 |
| 6,246,142 B1 * | 6/2001 | Asao et al. | ................. | 310/217 |
| 6,249,072 B1 * | 6/2001 | Sakagami et al. | ......... | 310/217 |
| 6,262,511 B1 * | 7/2001 | Ohashi et al. | .............. | 310/258 |
| 6,265,804 B1 * | 7/2001 | Nitta et al. | ................. | 310/259 |
| 6,335,606 B1 * | 1/2002 | Minagawa et al. | ......... | 318/801 |
| 6,448,682 B1 * | 9/2002 | Sakagami et al. | .......... | 310/216 |
| 6,472,788 B1 | 10/2002 | Nakano | | |
| 6,590,312 B1 * | 7/2003 | Seguchi et al. | ............. | 310/266 |
| 6,624,545 B1 * | 9/2003 | Furuse | ........................ | 310/217 |
| 6,727,632 B1 * | 4/2004 | Kusase | ....................... | 310/266 |
| 2001/0015589 A1 | 8/2001 | Sakagami et al. | | |
| 2004/0119466 A1 | 6/2004 | Akatsu et al. | | |

FOREIGN PATENT DOCUMENTS

| | | | |
|---|---|---|---|
| DE | 27 27 490 A | | 1/1979 |
| EP | 0 509 119 A1 | | 10/1992 |
| EP | 1191673 | * | 9/2001 |
| JP | 60-170431 A | | 9/1985 |
| JP | 8-275468 A | | 10/1996 |
| JP | 11-299152 A | | 10/1999 |
| JP | 11341757 | * | 10/1999 |
| JP | 2001-128423 A | | 5/2001 |
| JP | 2001-218431 A | | 8/2001 |
| JP | 2002-345189 A | | 11/2002 |
| JP | 2002-369424 A | | 12/2002 |

OTHER PUBLICATIONS

U.S. Appl. No. 10/830,105, filed Apr. 23, 2004, Arimitsu et al.

* cited by examiner

*Primary Examiner*—Burton Mullins
(74) *Attorney, Agent, or Firm*—Foley & Lardner LLP

(57) ABSTRACT

In a rotating machine, a plurality of laminated electromagnetic steel sheets constitutes at least one of a stator and a rotor and a plurality of permanent joining portions to unit each of the laminated electromagnetic steel sheets to form a corresponding one of the stator and the rotor, the plurality of permanent joining portions being set to be located at positions at which an integration value of a magnetic flux density with respect to a plane enclosed with the permanent joining portions is always zeroed.

13 Claims, 5 Drawing Sheets

CURRENT 1

CURRENT 2

CURRENT 1 + CURRENT 2 (COMPOUND CURRENT)

CURRENT 1 MAKES THE INNER ROTOR FORCE+
CURRENT 2 MAKES THE OUTER ROTOR FORCE

ROTATING MACHINE

BACKGROUND OF THE INVENTION

1. Field of the Invention

The present invention relates to a technical field of a rotating machine applicable to a hybrid vehicle.

2. Description of the Related Art

A Japanese Patent Application First Publication No. 2002-369424 published on Dec. 20, 2002 exemplifies a previously proposed permanent magnet (type) motor that is equipped with a stator on which windings are wound and a rotor constituted by a plurality of permanent magnets and an iron core. A plurality of permanent magnets are arranged in such a way that their respective magnet surfaces are directed toward a radial direction of the rotor with a revolutional axis of the rotor as a center. The iron core is formed of laminated flat rolled electromagnetic steel sheets (or hereinafter simply referred to as laminated electromagnetic steel sheets). The iron core is welded on a peripheral surface of the iron core at a position in a radial direction of the rotor with respect to a magnetic pole center of each permanent magnet.

SUMMARY OF THE INVENTION

In the previously proposed permanent magnet type motor, a welding is used, in place of fastening pins, to unite the plurality of laminated electromagnetic steel sheets to constitute the rotor. Positions to be welded and the number of welds are not prescribed. Hence, if a magnetic flux alternates in a plane enclosed by the welding portions, an induced current is caused to flow and a joule loss is developed. Consequently, a motor efficiency cannot be enhanced.

It is, hence, an object of the present invention to provide a rotating machine which is capable of suppressing the joule loss developed due to a flow of the induced current according to a magnetic flux alternation and achieving a high motor efficiency.

According to one aspect of the present invention, there is provided a rotating machine, comprising: a plurality of laminated electromagnetic steel sheets constituting at least one of a stator and a rotor; and a plurality of permanent joining portions to unite each of the laminated electromagnetic steel sheets to form a corresponding one of the stator and the rotor, the plurality of permanent joining portions being set to be located at positions at which an integration value of a magnetic flux density with respect to a plane enclosed with the permanent joining portions is always zero.

According to another aspect of the present invention, there is provided a method applicable to a rotating machine, comprising: providing a plurality of laminated electromagnetic steel sheets constituting at least one of a stator and a rotor; uniting each of the laminated electromagnetic steel sheets to form a corresponding one of the stator and the rotor by means of a plurality of permanent joining portions; and setting the plurality of permanent joining portions to be located at positions at which an integration value of a magnetic flux density with respect to a plane enclosed with the permanent joining portions is always zero.

This summary of the invention does not necessarily describe all necessary features so that the present invention may also be sub-combination of these described features.

DETAILED DESCRIPTION OF THE PREFERRED EMBODIMENTS

Reference will hereinafter be made to the drawings in order to facilitate a better understanding of the present invention.

(First Embodiment)

[A Whole Configuration of a Hybrid Drive Unit]

Figure 1:
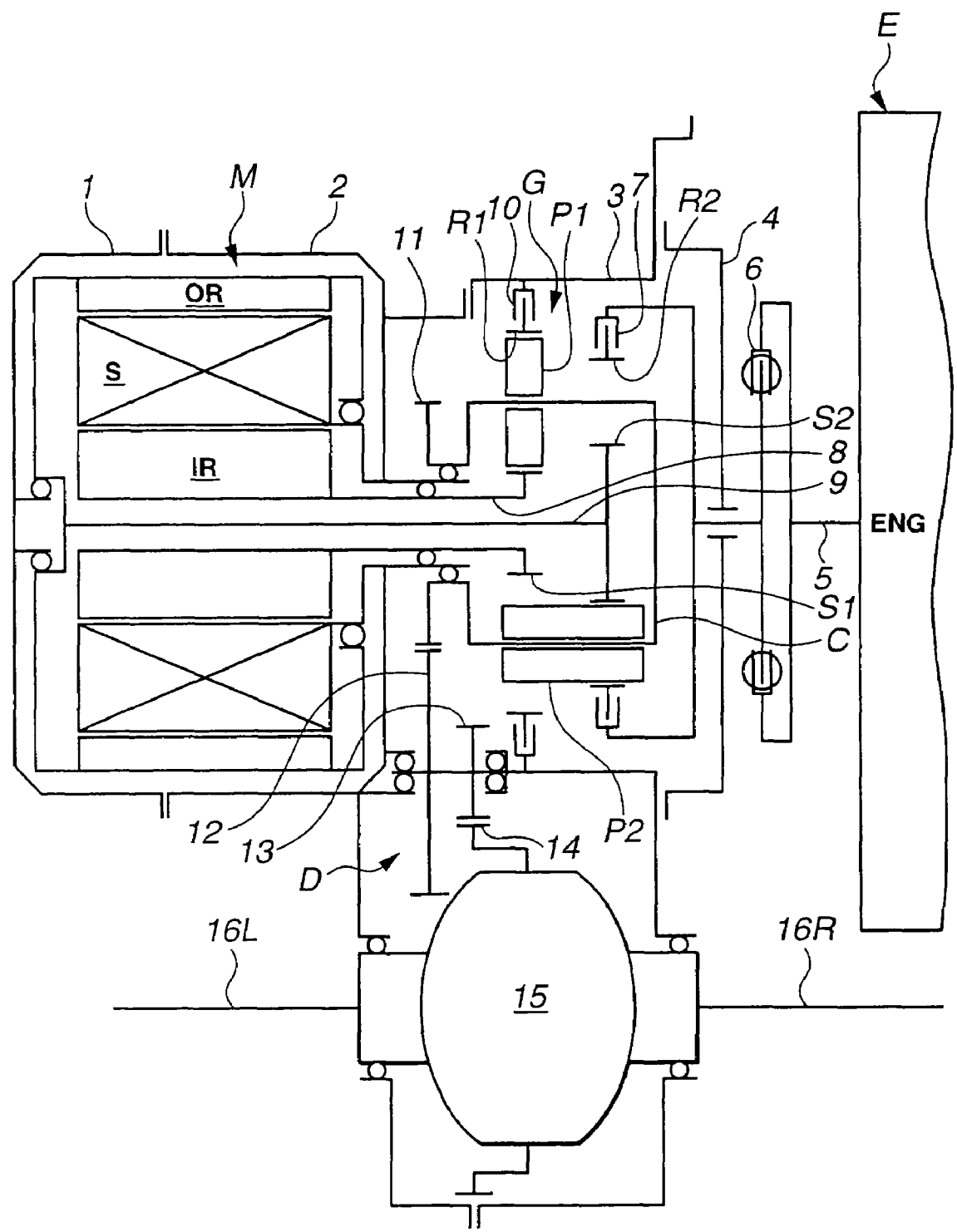
FIG. 1 is a rough configuration view of a hybrid drive unit for a hybrid vehicle to which a plural-axis multilayer motor M (a rotating machine) in a first preferred embodiment is applicable.

FIG. 1 shows a whole configuration view of a hybrid drive unit to which a rotating machine in a first preferred embodiment is applicable, The hybrid drive unit includes, as shown in FIG. 1, an engine E, a plural-axis multilayer motor M (rotating machine), a Ravigneaux type planetary gear train G, a drive output mechanism D, a motor cover 1, a motor casing 2, a gear housing 3, and a front cover 4. Engine E is a main power source of the hybrid drive unit. An output axle 5 of engine E and a second ring gear R2 of Ravigneaux (type) composite planetary gear train G are linked together via a rotation absorbing damper 6 and an engine clutch 7. A plural-axle multilayer motor M is an auxiliary power source having two motor/generator functions although plural-axis multilayer motor M is, on appearance, a single motor. Plural-axis multilayer motor M includes: a stator S as a stationary armature on which coils are wound; an inner rotor IR arranged on an inside of stator S and on which permanent magnets is buried; and an outer rotor OR arranged on an inside of stator S and on which other permanent magnets are buried, stator S, inner rotor IR, and outer rotor OR being coaxially arranged in a three-layer arrangement. A first motor hollow axle 8 fixed to inner rotor IR is linked to a first sun gear S1 of Ravigneaux (type) composite planetary gear train G. A second motor axle 9 fixed onto outer rotor OR is linked to second sun gear S2 of Ravigneaux (type) composite planetary gear train G.

Ravigneaux (type) composite planetary gear train G is a differential gear mechanism having a continuously variable transmission function in which a shift ratio is varied unlimitedly by controlling two motor revolution speeds. Ravigneaux (type) composite planetary gear train G is constituted by five revolutional elements of a common carrier C supporting mutually meshed first pinion P1 and second pinion P2, a first sun gear S1 meshed with first pinion P1, a first ring gear R1 meshed with first pinion P1, and a second ring gear R2 meshed with second pinion P2. A low brake 10 is interposed to fix Ravigneaux type composite planetary gear train G to a low speed gear ratio by means of an engagement of low brake 10. Common carrier C is linked to output gear 11.

Drive output mechanism D is constituted by an output gear 11, a first counter gear 12, a second counter gear 13, a drive gear 14, a differential 15, and drive shafts 16L and 16R. An output revolution and an output torque from output gear 11 are passed through first counter gear 12→second counter gear 13→drive gear 14→differential 15 and are transmitted to drive wheels (not shown) through drive shafts 16L and 16R. That is to say, hybrid drive unit is constituted by linking second ring gear R2 with engine output axle 5, linking first sun gear S1 with first motor hollow axle 8, and linking second sun gear S2 with second motor axle 9, and linking common carrier C with output gear 11.

[Structure of Plural-axis Multilayer Motor]

Figure 2:
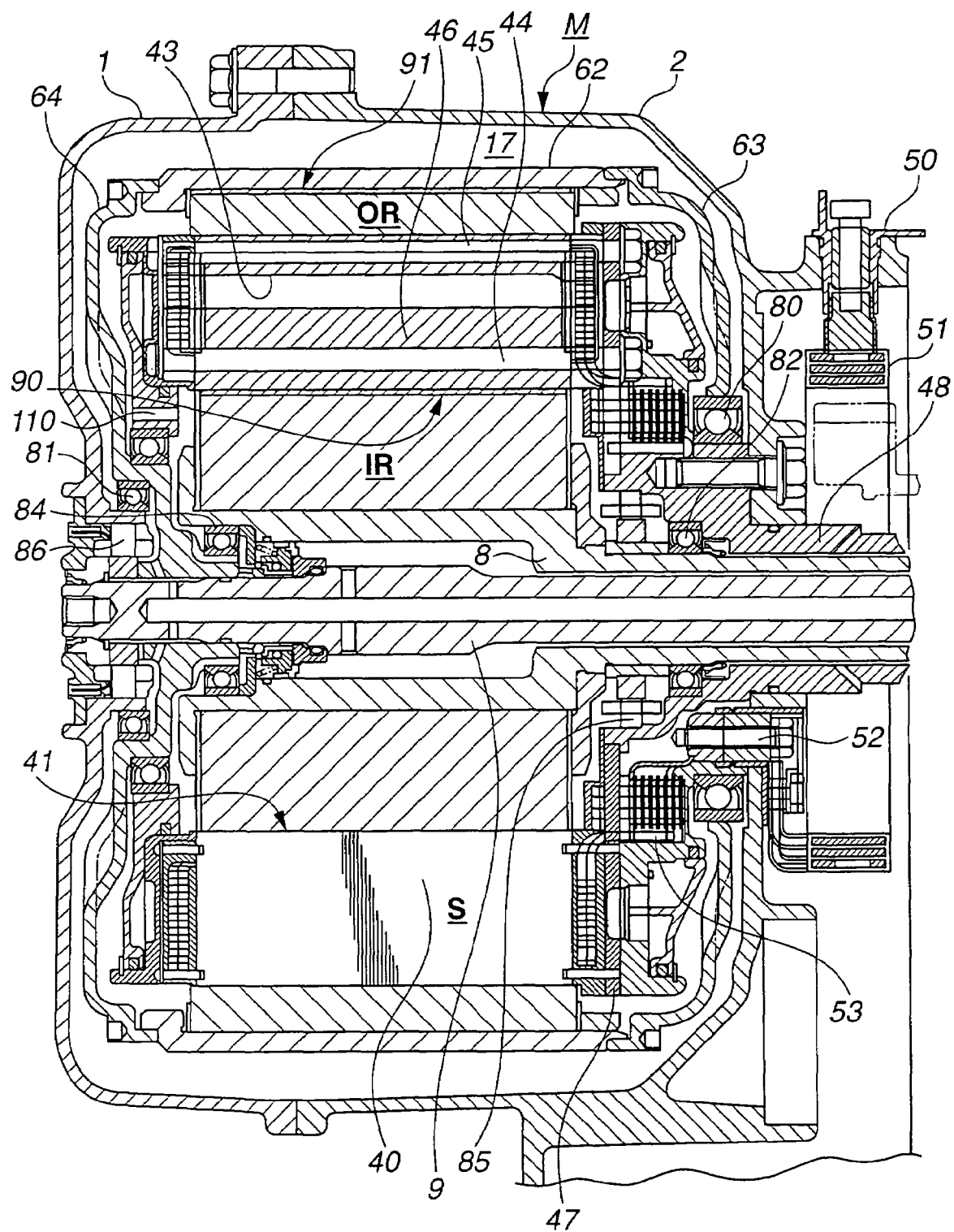
FIG. 2 is a longitudinal cross sectional side view representing a ⅓ model of a plural-axis multilayer motor M in the first preferred embodiment shown in FIG. 1.
Figure 3:
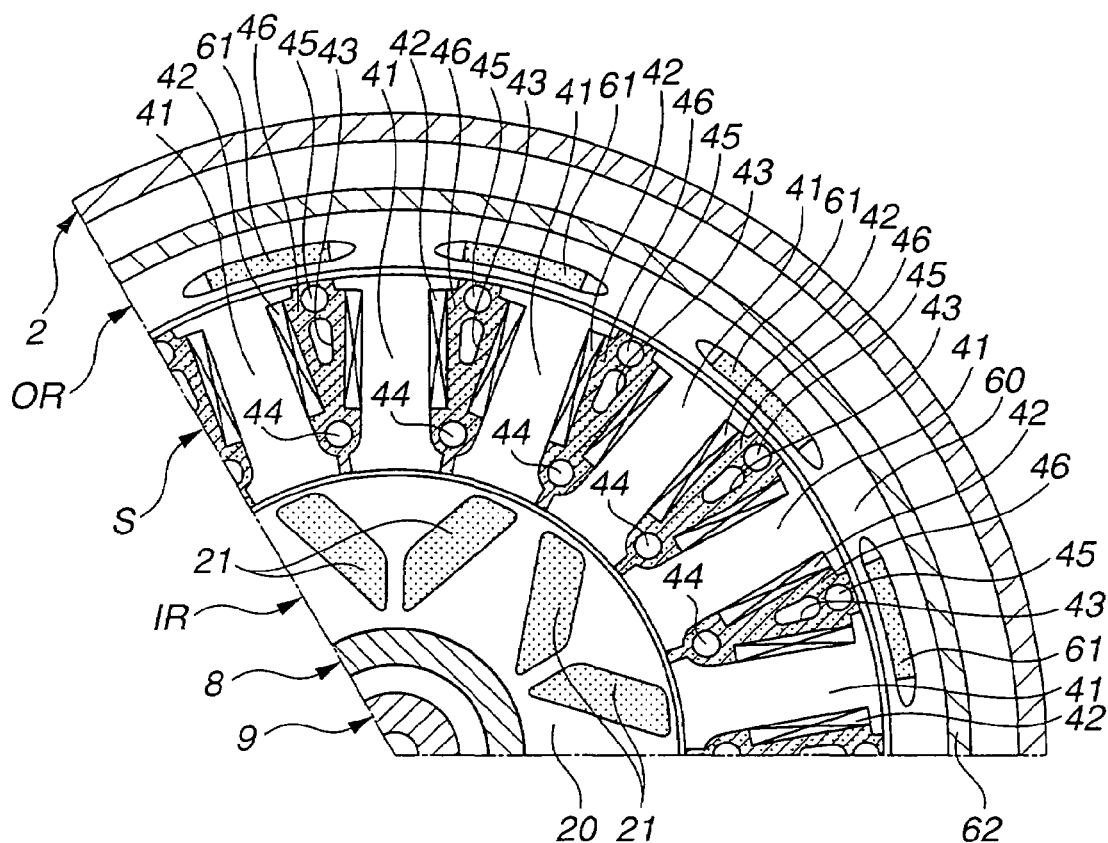
FIG. 3 is a longitudinal cross sectional front view representing a ⅓ model of a plural-axis multilayer motor M in the first preferred embodiment shown in FIG. 1.
Figure 4A:
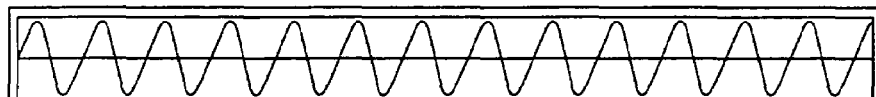
FIGS. 4A, 4B, and 4C are explanatory views representing one example of a compound current to be supplied to stator coils of the plural-axis multilayer motor M in the first embodiment shown in FIG. 1.
Figure 4B:
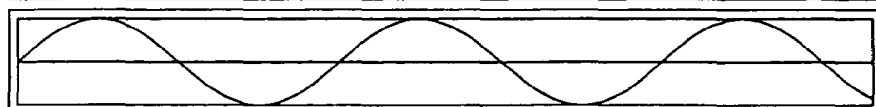
Figure 4C:
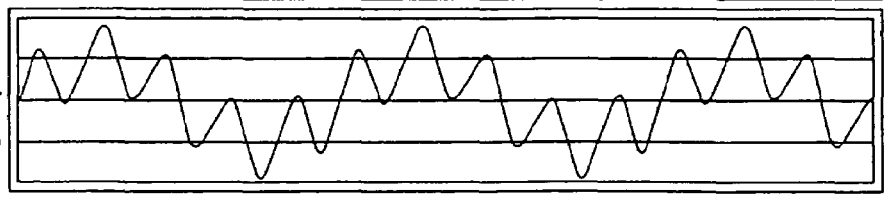

FIG. 2 shows a longitudinally cross sectioned side view representing plural-axis multilayer motor M in the first embodiment. FIG. 3 shows a longitudinal cross sectioned front view representing a ⅓ model of plural-axis multilayer motor M in the first embodiment. FIGS. 4A, 4B, and 4C show components of a compound (or composite) current and the compound current which is caused to flow through stator coils of plural-axis multilayer motor M in the first embodiment.

Inner rotor IR has its inner peripheral surface fixed to a step-difference axial terminal portion of first motor hollow axle 8 by means of a press in (or shrink fit). As shown in FIG. 3, twelve inner rotor magnets 21 (permanent magnets) arranged with a formation of a magnetic flux taken into consideration are buried into a (inner) rotor base 20 made of laminated electromagnetic steel sheets in an axial direction of (inner) rotor base 20, as shown in FIG. 3. It is noted that four inner rotor permanent magnets 21 by means of a letter-V arrangement are constituted by a one-pole pair and three-pole pairs are constituted as a whole periphery of (inner) rotor base 20. Stator S includes: stator teeth laminated bodies 41 on which stator teeth 40 are laminated; coil windings 42; stator coolant water passages 43; inner side bolts and nuts 44; outer side bolts and nuts 45; and non-magnetic material resin layers 46. Then, a front side end portion of stator S is fixed to motor casing 2 via front surface side end plate 47 and stator fixation casing 48. For coils 42, the number of coils are 18. As shown in FIG. 3, six-phase coils are arranged on the periphery of stator S by repeating three times, as shown in FIG. 3. Then, the compound current as shown in FIG. 4C is caused to flow through a power supply connection terminal 50, a bus bar diameter direction laminated body 51, a power supply connector 52, and a bus bar radial directional laminated body 53 from an inverter (not shown). The compound current is a composite of three-phase alternating current to drive inner rotor IR and sixth-phase alternating current to drive outer rotor OR. An outer peripheral surface of outer rotor OR is fixed to an outer rotor casing 62 by means of a brazing or adhesion. Then, a front surface side linkage casing 63 is fixed to a front surface side of outer casing 62. A rear surface side linkage casing 64 is fixed to a rear surface of outer rotor casing 64. A second motor axle 9 is spline coupled to a rear surface side linkage casing 64. Twelve outer rotor magnets 61 (permanent magnets) arranged with the formation of magnetic flux taken into consideration with respect to a rotor base 60 made of laminated electromagnetic steels are buried in the axial direction via a space with both end positions. This outer rotor magnets 61 constitutes one-pole pair of two outer rotor magnets 61 and the number of pole pairs are six pole pairs on the whole periphery. In FIG. 2, a pair of outer rotor bearings 80 and 81 serves to support outer rotor 6 on motor casing 2 and motor cover 1. Reference numerals 80 and 81 constitute a pair of outer motor bearings for supporting outer rotor 6 on motor casing 2 and motor cover 1. A reference numeral 82 denotes an inner rotor bearing which supports inner rotor IR on a motor casing 2. A reference numeral 83 denotes a stator bearing which serves to support stator S on outer rotor OR and reference numeral 84 denotes an intermediate bearing intervened between first motor hollow axle 8 and a second motor axle 9. In addition, in FIG. 2, a reference numeral 85 denotes an inner rotor resolver to detect a revolution position of inner rotor IR. A reference numeral 86 denotes an outer rotor resolver to detect a revolution position of outer rotor OR.

[Structure of Rotor Weld Portion]

Figure 5:
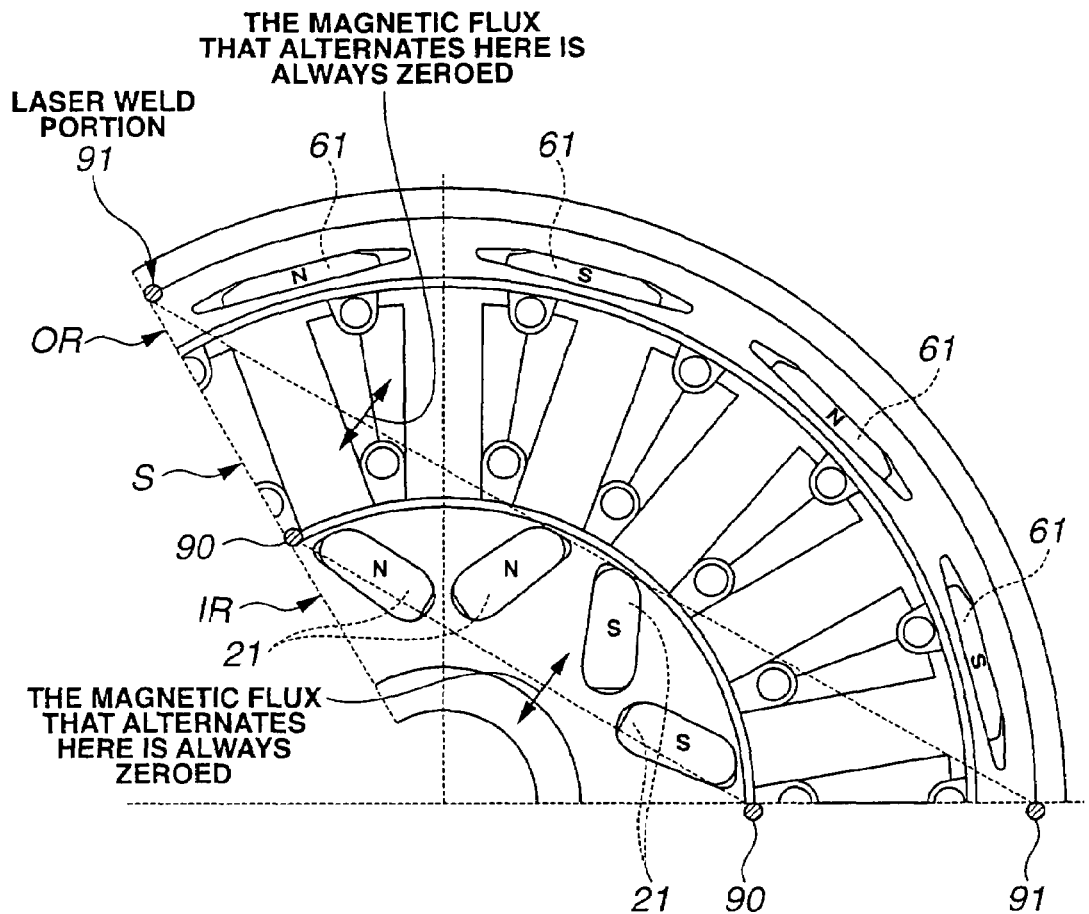
FIG. 5 is an explanatory view of the ⅓ model shown in FIG. 3 representing weld portions of an outer rotor and of an inner rotor of the plural-axis multilayer motor M in the first embodiment shown in FIG. 1.

FIG. 5 shows a ⅓ model view representing a rotor weld portion structure of plural-axis multilayer motor M in the first embodiment.

Rotor base 20 of inner rotor IR constituted by laminated electromagnetic steel sheets is united by means of three laser weld portions 90 (weld portion) extended at equal intervals (an interval of 120 degrees) on an outer peripheral surface position of (inner) rotor base 20 faced toward an inner surface of stator S, as shown in FIG. 5.

Rotor base 60 of outer rotor OR constituted by laminated electromagnetic steel sheets is united by means of three laser weld portions 91 (weld portions) extended in an axial direction at equal intervals (an interval of 120 degrees) on an outer peripheral surface position faced toward an inner surface of outer rotor casing 62. That is to say, intervals of the laser welds P of laser weld portions 90 and 91 are given by the following equation (1) when the number of pole pairs of outer rotor OR is No and the number of pole pairs of inner rotor IR is Ni. CM(360/Ni, 360/No)(<360) . . . (1). This equation means to calculate the common multiple between 360/Ni and 360/No. Since, in the first embodiment, outer rotor OR has six pole pairs and inner rotor IR has three pole pairs, the number of pole pairs 6 of the larger one has a relationship of 6=3×2 with respect to the number of pole pairs (three) of the smaller one. Thus, common multiples are 120, 240, in the above-described equation (1), three weld portions can be allowed for outer rotor OR and inner rotor IR. Only 120 degree intervals allows weld portion to be disposed symmetrically at equal intervals in a peripheral direction of each rotor with respect to a rotary axis of each rotor.

Next, an operation of plural-axis multilayer motor M in the first embodiment will herein be described.

[Basic Function of Plural-axis Multilayer Motor]

Since plural-axis multilayer motor M manufactured by two lines of magnetic forces of outer rotor magnetic force line and inner rotor magnetic force are adopted in form of two rotors and one stator, coils 42 and inverter connected to coils 42 can be commonly used for two of inner rotor IR and outer rotor OR. Then, as shown in FIGS. 4A through 4C, a composite current which is a superposition of a current for inner rotor IR and for a current for outer rotor OR is supplied to coils 42 of a single stator S so that two rotors IR and OR can independently be controlled. In other words, on appearance, this is a single plural-axis multilayer motor M that can be used as the combination of different kinds or same kinds of functions of motor function and generator function. Thus, for example, plural-axis multilayer motor M can remarkably be compacted as compared with a case in which two of a motor having the rotor and the stator and a generator having the rotor and stator are installed and advantageous from viewpoints of a space, a cost, and a weight. In addition, due to the common use of coils for two rotors, losses due to the flow of current (copper loss and switching loss) can be prevented. In addition, a high degree of freedom in selection is provided in such a way that not only a usage of only a composite current control (motor+generator) but also the usage of (generator+generator) are possible. For example, as in the case of the first embodiment, in a case where the drive source of the hybrid vehicle is adopted, a most effective or most efficient combination in accordance with to the vehicular state can be selected from among multiple number of alternatives.

[Integration (Uniting) Action of Electromagnetic Steel Sheets]

Figure 6:
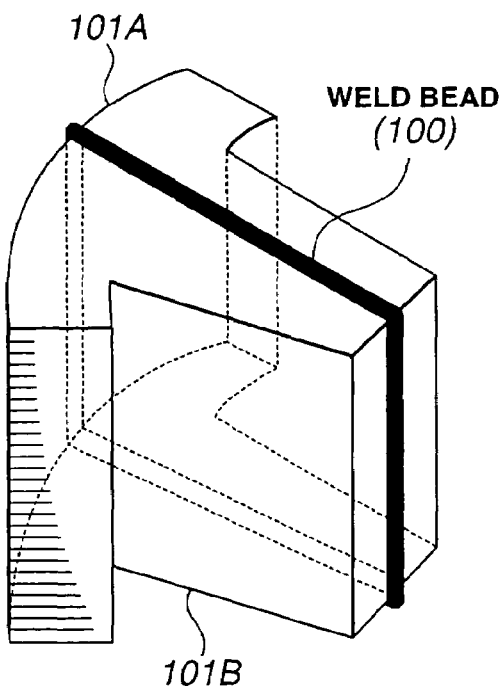
FIG. 6 is a perspective view representing an example of a stator teeth laminated body whose whole periphery is united while forming a weld bead.

At first, a plurality of laminated electromagnetic steel sheets constitute the rotating machine in order to reduce an eddy current loss of a magnetic path through which a magnetic flux is passed. In this case, when the rotor and stator are constructed with multiple numbers of laminated electromagnetic steel sheets united together, a jig to unite the laminated electromagnetic steel sheets is needed and it becomes difficult in assembly operations of rotor and stator. In a case where the uniting (or integration) of the electromagnetic steel sheets are positively carried out, such a method in which electromagnetic steel sheets are united by means of welding or caulking. However, if the magnetic flux alternates a surface enclosed with the weld portion or a caulked portion, an induced current caused by this alternation of the magnetic flux is caused to flow therethrough, a loss caused by a joule heat in accordance with a Joule's law (hereinafter called, a joule loss) occurs. This cannot increase a motor efficiency. For example, in a case where an outer peripheral surface of each of stator teeth formed by the laminated electromagnetic steel sheets, a weld bead 100 is formed on an outer peripheral end of laminated electromagnetic steel sheets as shown in FIG. 6, a circuit constituted by weld bead 100, an uppermost plate 101A, and a lowest sheet 101B is formed. If the magnetic flux alternates the circuit formed by means of weld bead 100, the induced current is caused to flow through the circuit so that the joule loss occurs.

On the other hand, in the first embodiment, three laser weld portions 90 and 91 are disposed on peripheral (circumferential) portions of plural-axis multilayer motor M at equal intervals of 120 degrees, respectively. Therefore, magnetic flux passes in a closed loop that is formed by one pair of NS magnetic poles and two pairs of NS magnetic poles. As shown in FIG. 5, an integration value of a whole magnetic flux density at a left or a right side of a line connecting any two laser weld portions 90 and 90 is zero. In addition, the integration value of the whole magnetic flux density at a left or a right side of a line connecting any two laser weld portions 91 and 91 is zero. Consequently, the magnetic fluxes passing through an area enclosed with laser weld portions 90 and 90 and with other laser weld portions 91 and 91 are always zero. Thus, no induced current is developed.

It is possible to suppress the joule loss at a small value. A high motor efficiency can, thus, be achieved. Furthermore, the weld portions are as small number as three (only three). The manufacturing cost accordingly be reduced. In addition, since inner rotor IR and outer rotor OR are united as described above, respectively, the assembly operations of this two rotors can be carried out. Next, the following advantages listed below can be obtained by plural-axis multiple layer motor M in the first embodiment.

(1) In the rotating machine in which at least one of the motor and the stator is constituted by laminated electromagnetic steel sheets, one of each of the rotors and the stator which is constituted by the electromagnetic steel sheets is united by means of the plurality of weld portions, the weld portions are installed at positions, each of the positions are installed at positions, each of the positions being a position at which the integration value of the magnetic flux passing through a plane enclosed with the weld portions is always zero. Hence, the joule loss developed due to the flow of the induced current by means of the magnetic flux alternation can be suppressed. Thus, the high motor efficiency can be achieved.

(2) Each of the rotors is provided with magnets 21 and 61 buried in the direction of the revolution axis and rotor bases (inner rotor base and outer rotor base) 20 and 60 made of the laminated electromagnetic steel sheets. The rotors are constituted by inner rotor IR and outer rotor OR whose number of pole pairs are different according to the number of permanent magnets 21 and 61. Stator S is interposed between inner rotor IR and outer rotor OR. Respective stator teeth laminated bodies 41 are united together. Inner rotor IR and outer rotor OR are integrated (or united) respectively by means of laser weld portions 90 and 91. The number P of laser weld portions 90 and 91 is expressed in the following equation: CM(360/Ni, 360/No)<360 described in equation (1). In addition, the weld portions are placed in the peripheral direction at equal intervals with respect to the revolution axis. Hence, the high motor efficiency can be achieved. In addition, the assembly operation of inner rotor IR and outer rotor OR can easily be achieved without any fixing jig. Thus, the manufacturing cost can be reduced due to small number of the weld portions.

(Second Embodiment)

Figure 7:
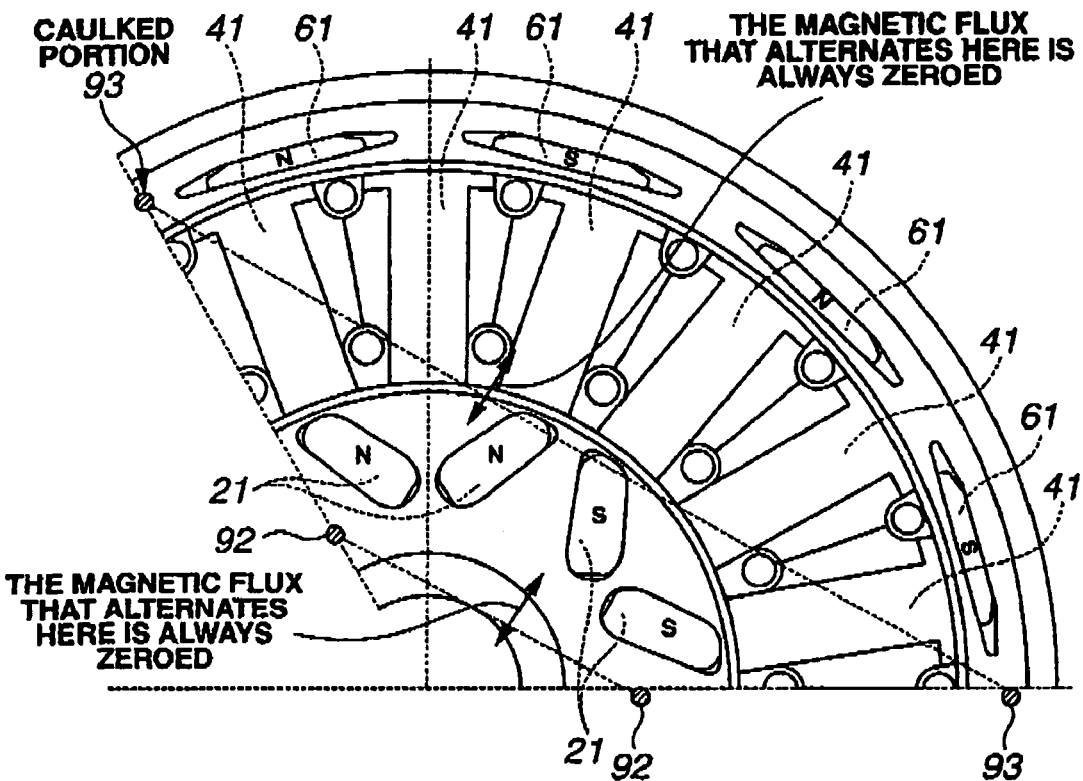
FIG. 7 is a ⅓ model view representing a structure of caulked portions located on the outer rotor and inner rotor of the plural-axis multilayer motor in a second preferred embodiment.

The rotating machine in a second embodiment has the same structure as the first embodiment except laser weld portions 90 and 91. However, in the second embodiment, in place of laser weld portions 90 and 91, caulked portions 92 and 93 serve to unite inner rotor IR and outer rotor OR. That is to say, rotor base 20 of inner rotor IR constituted by the laminated electromagnetic steel sheets is united by means of three caulked portions 92 extended at a substantially center position in the radial direction of outer rotor OR in the axial direction at equal intervals (each of intervals of 120 degrees) in the circumferential direction, as appreciated from FIG. 7. It is noted that since the other structure is the same as described in the first embodiment, the detailed description and drawings will herein be omitted. The magnetic flux passing through the area enclosed with caulked portions 92 and 92 is zero. Hence, the action in the second embodiment is the same as described in the first embodiment.

Next, the advantages of the plural-axis multilayer motor M in the second embodiment will be described below. In the plural-axis multilayer motor M in the second embodiment, the following advantages can be obtained in addition to the advantages of (1) and (2) described in the first embodiment.

(3) In place of the welding at laser weld portions 90 and 91, rotors or stator constituted by the laminated electromagnetic steel sheets is united by means of caulked portions 92 and 93. Hence, since a constant force is applied from a vertical direction to the laminated electromagnetic steel sheets using the caulking formed previously on the electromagnetic steel sheets to unite to form each of the rotors or stator. As compared with the welding, the manufacturing step can be shortened and the manufacturing cost can remarkably be reduced.

(Third Embodiment)

In a third embodiment of the rotating machine, stator S is constructed along a plurality of independent divisional stator teeth laminated bodies 41 aligned along a circumferential surface of stator S. One divisional stator teeth laminated body 41' is united with another divisional stator teeth laminated body 41' to form each of the independent divisional stator teeth laminated body 41.

Figure 8:
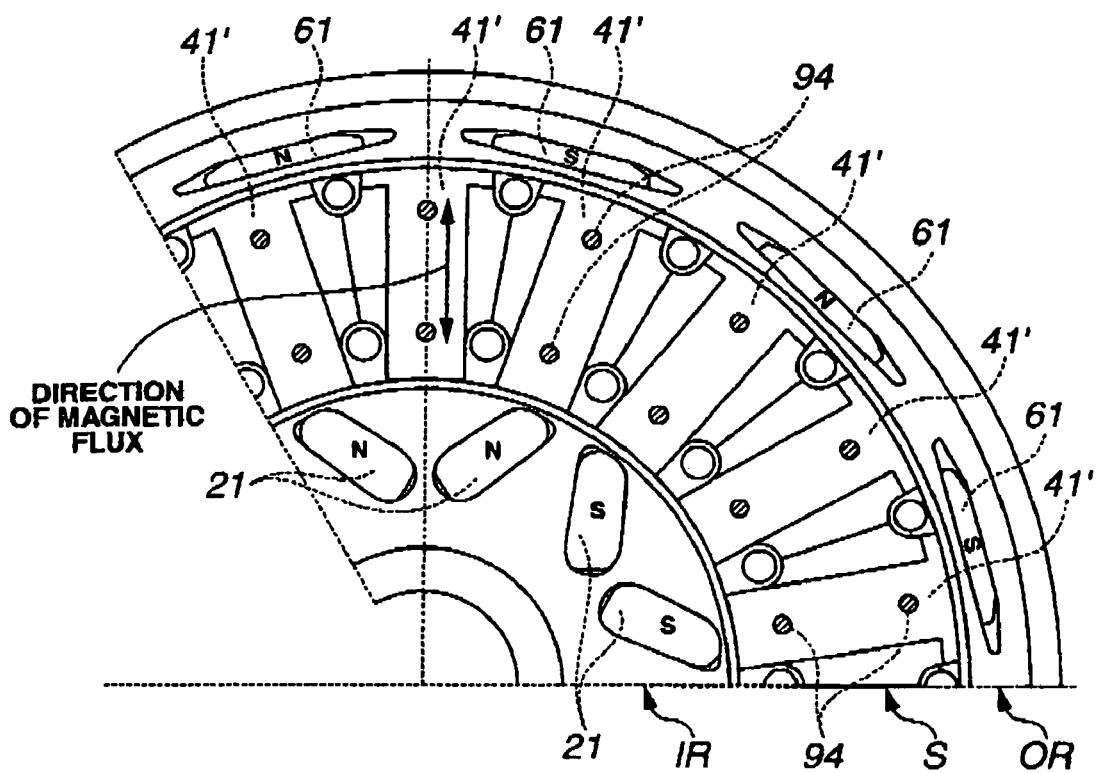
FIG. 8 is a ⅓ model view representing a structure of the weld portions of a stator of the plural-axis multilayer motor M in a third preferred embodiment.

In details, as shown in FIG. 8, rotors are constituted by inner rotor IR and outer rotor OR whose pole pair numbers are different from each other according to the number of permanent magnets 21 and 61 buried in the revolutional axis direction. Stator S is interposed between inner rotor IR and outer rotor OR. Eighteen independent divisional stator teeth laminated bodies 41' constituted by the laminated electromagnetic steel sheets (stator teeth 40) and coils 42 are aligned along the circumferential direction to constitute stator S. Electromagnetic steel sheets are united by means of welding (spot weld portions 94 and 94 are formed to form each divisional stator teeth 41'). As described above electromagnetic steel sheets are united by means of welding. Two spot weld portions 94 and 94 are located respectively on a front inner position of each independent divisional stator teeth laminated bodies 41' and on a rear inner positions of the same independent divisional stator teeth (laminated bodies 41'). As shown in FIG. 8, a line connecting between spot weld portions 94 and 94 located on the front inner position and rear inner position of each of the same independent divisional stator teeth 41' is parallel to the direction of the magnetic flux. The other structure is the same as the first preferred embodiment. Hence, the detailed description and drawings will herein be omitted. In addition, the magnetic flux passing through the area enclosed with spot weld portions 94 and 94 is zero and the magnetic flux passing through any other pair of spot weld portions 94 and 94 is also zero. Hence, the same action as the first embodiment is exhibited.

Next, advantages of the rotating machine in the third embodiment will be described below. In plural-axis multilayer motor M in the third embodiment, the following advantages can be obtained in addition to the advantage (1) described in the first embodiment.

(4) The rotors are constituted by inner rotor IR and outer rotor OR whose numbers of pole pairs are different from each other according to magnets 21 and 61 buried in the revolutional axis direction. Stator S is interposed between inner rotor IR. and outer rotor OR and is constituted by eighteen divisional stator teeth laminated body 41' of the laminated electromagnetic steel sheets and coils 42 in the circumferential direction. The electromagnetic steel sheets are united by means of spot weld portions 94 and 94 to form respective divisional teeth 41'. Two weld portions of spot weld portions 94 and 94 are set at the front inner position of each independent divisional stator teeth 41' and the rear inner position thereof whose connecting line is parallel to the direction of the magnetic flux, the high motor efficiency can be achieved. In addition, the assembly of stator S can easily be carried out without use of any fixing jig. It is noted that equation (1) can be applied to the caulked portion of the second embodiment.

As described above, the rotating machine according to the present invention has been explained on the basis of the first through third embodiments. A specific structure is not limited to these embodiments. Various changes and modification can be made without departing from the scope of the claims and a sprit of the present invention.

For example, in the first embodiment, the plural-axis multilayer motor M as the rotating machine is exemplified which is applicable to the hybrid drive unit. However, the present invention is also applicable to another rotating machine in which the laminated electromagnetic steel sheets are adopted as at least one or both of the rotor and stator.

Each constituent member of inner rotor IR, outer rotor OR, and stator S may be united by means of the welding or the caulking according to a combination of the first embodiment and the second embodiment or a combination of the second embodiment and the third embodiment.

The entire contents of a Japanese Patent Application No. 2003-205296 (filed in Japan on Aug. 1, 2003) are herein incorporated by reference. The scope of the invention is defined with reference to the following claims.

What is claimed is:

1. A rotating machine, comprising:
a plurality of laminated electromagnetic steel sheets constituting at least one of a stator and a rotor; and
a plurality of permanent joining portions to unite each of the laminated electromagnetic steel sheets to form a corresponding one of the stator and the rotor, the plurality of permanent joining portions being set to be located at positions at which an integration value of a magnetic flux density with respect to a plane enclosed with the permanent joining portions is always zero and wherein the rotor is provided with permanent magnets buried in a direction of a revolution axis of the rotor and with the laminated electromagnetic steel sheets and is constituted by an inner rotor and an outer rotor whose number of pole pairs are different from each other according to a number of the permanent magnets of each of the inner rotor and the outer rotor, the stator is interposed between the inner rotor and the outer rotor and comprises stator teeth, each of the stator teeth being united together, wherein the laminated electromagnetic steel sheets are united to form each of the inner rotor and outer rotor through the permanent joining portions, and the permanent joining portions are disposed at equal intervals in a peripheral direction of each of the inner rotor and the outer rotor with respect to the revolution axis, wherein the permanent joining portions comprise weld portions.

2. A rotating machine as claimed in claim 1, wherein the permanent joining portions comprise caulked portions.

3. A rotating machine as claimed in claim 2, wherein the laminated electromagnetic steel sheets are united to form each of the inner rotor and the outer rotor through the caulked portions, and the caulked portions are disposed at equal intervals in a peripheral direction of each of the inner rotor and the outer rotor with respect to the revolution axis thereof and wherein the inner rotor has three pole pairs, the outer rotor has six pole pairs, the number P of the caulked portions is three, an inner rotor base of the inner rotor constituted by the laminated electromagnetic steel sheets is united with three caulked portions extended at positions on an inner surface of the stator at equal intervals of 120 degrees in a circumferential direction of the inner rotor base, and an outer rotor base of the outer rotor constituted by the laminated electromagnetic steel sheets is united with three caulked portions extended at positions on an inner surface of the stator at equal intervals of 120 degrees in a circumferential direction of the outer rotor base.

4. A rotating machine as claimed in claim 1, wherein the laminated electromagnetic steel sheets are united to form each of the inner rotor and outer rotor through the weld portions, and the weld portions are disposed at the equal intervals in the peripheral direction of each of the inner rotor and the outer rotor with respect to the revolution axis.

5. A rotating machine as claimed in claim 1, wherein the stator is constituted by individual divisional stator teeth of the laminated electromagnetic steel sheets and coils which are aligned in a circumferential direction of the stator, each individual divisional stator tooth being united with the permanent joining portions and the permanent joining portions being set at a plurality of positions of the same individual divisional stator teeth which are parallel to directions of magnetic fluxes.

6. A rotating machine as claimed in claim 5, wherein the permanent joining portions are located at a front inner position of each individual divisional stator tooth and a rear inner position thereof, a line connecting the front inner position of each individual divisional stator tooth and the rear inner position of the same divisional stator tooth being parallel to the directions of the magnetic fluxes.

7. A rotating machine as claimed in claim 6, wherein the permanent joining portions are spot weld portions.

8. A rotating machine as claimed in claim 1, wherein the inner rotor has three pole pairs, the outer rotor has six pole pairs, the number of weld portions are three, an inner rotor base of the inner rotor constituted by the laminated electromagnetic steel sheets is united with three weld portions extended at positions on an outer peripheral surface of the inner rotor base faced toward an inner surface of the stator at equal intervals of 120 degrees in a circumferential direction of the inner rotor base, and an outer rotor base of the outer rotor constituted by the laminated electromagnetic steel sheets is united with three weld portions extended at positions on an outer peripheral surface of the outer rotor base faced toward an inner surface of an outer rotor casing at equal intervals of 120 degrees in the circumferential direction of the outer rotor base.

9. A rotating machine as claimed in claim 8, wherein the weld portions are laser weld portions.

10. A rotating machine as claimed in claim 1, wherein intervals of the positions of the permanent joining portions in a peripheral direction of each rotor correspond to a common multiple of $360°/Ni$ and $360°/No$, wherein $Ni$ is the number of pole pairs of the inner rotor and $No$ is the number of pole pairs of the outer rotor.

11. A rotating machine as claimed in claim 10, wherein the common multiple is less than 360°.

12. A rotating machine, comprising:
laminated electromagnetic steel sheet means constituting at least one of stator means and rotor means; and
permanent joining means for uniting each of the laminated electromagnetic steel sheet means to form a corresponding one of the stator means and the rotor means, the permanent joining means being set to be located at positions at which an integration value of a magnetic flux density with respect to a plane enclosed with the permanent joining means is always zero and wherein the rotor means is provided with permanent magnets buried in a direction of a revolution axis of the rotor means and with the laminated electromagnetic steel sheet means and is constituted by an inner rotor and an outer rotor whose number of pole pairs are different from each other according to a number of the permanent magnets of each of the inner rotor and the outer rotor, the stator means is interposed between the inner rotor and the outer rotor and comprises stator teeth, each of the stator teeth being united together, the laminated electromagnetic steel sheet means are united to form each of the inner rotor and outer rotor through the permanent joining means, and the permanent joining means are disposed at equal intervals in a peripheral direction of each of the inner rotor and the outer rotor with respect to the revolution axis, wherein the permanent joining means are weld portions.

13. A method applicable to a rotating machine, comprising:
providing a plurality of laminated electromagnetic steel sheets constituting at least one of a stator and a rotor;
uniting each of the laminated electromagnetic steel sheets to form a corresponding one of the stator and the rotor by a plurality of permanent joining portions; and
setting the plurality of permanent joining portions to be located at positions at which an integration value of a magnetic flux density with respect to a plane enclosed with the permanent joining portions is always zero and wherein the rotor is provided with permanent magnets buried in a direction of a revolution axis of the rotor and with the laminated electromagnetic steel sheets and is constituted by an inner rotor and an outer rotor whose number of pole pairs are different from each other according to a number of the permanent magnets of each of the inner rotor and the outer rotor, the stator is interposed between the inner rotor and the outer rotor and comprises stator teeth, each of the stator teeth being united together, the laminated electromagnetic steel sheets are united to form each of the inner rotor and outer rotor through the permanent joining portions, and the permanent joining portions are disposed at equal intervals in a peripheral direction of each of the inner rotor and the outer rotor with respect to the revolution axis, wherein the permanent joining portions are weld portions.

* * * * *